United States Patent [19]

MacDowall

[11] Patent Number: 5,162,286

[45] Date of Patent: Nov. 10, 1992

[54] METHOD OF PRODUCING GRANULAR ACTIVATED CARBON

[76] Inventor: James D. MacDowall, 343 Kelvindale Road, Glasgow G12 OQU, Great Britain

[21] Appl. No.: 594,314

[22] Filed: Oct. 9, 1990

[30] Foreign Application Priority Data

Oct. 20, 1989 [GB] United Kingdom ............... 8923662

[51] Int. Cl.$^5$ .................. C01B 31/12; B01J 20/20
[52] U.S. Cl. ........................ 502/425; 55/74; 502/423; 502/424; 502/437
[58] Field of Search .............. 502/423, 424, 425, 437

[56] References Cited

U.S. PATENT DOCUMENTS

| | | | |
|---|---|---|---|
| 1,694,040 | 12/1928 | Ray | 502/425 |
| 1,735,096 | 11/1929 | Urbain | 502/425 |
| 1,819,165 | 8/1931 | Hass | 502/425 |
| 4,616,001 | 10/1986 | Sato | 502/437 |
| 4,999,328 | 3/1991 | Jain et al. | 502/185 |
| 5,039,651 | 8/1991 | Kosaka et al. | 502/424 |

FOREIGN PATENT DOCUMENTS 0329251 8/1989 European Pat. Off. ............ 502/437

302774 12/1928 United Kingdom .

OTHER PUBLICATIONS

F. Ruiz Bevla, et al, "Activated Carbon from Almond Shells". Chemical Activation 1, Jun. 1984, pp. 266–269.
F. Ruiz Bevla et al, "Activated Carbon from Almond Shells". Chemical Activation 2, Jun. 1984, pp. 269–271.
Chemical Abstracts, vol. 104, No. 10, Mar. 10, 1986, p. 136, column 1, abstract no. 71160d.
J. de D. Lopez-Gonzalez et al, Preparation and Characterization of Active Carbons from Olive Stones, 1980, pp. 413–418.

*Primary Examiner*—Paul E. Konopka
*Attorney, Agent, or Firm*—Ratner & Prestia

[57] ABSTRACT

There is described a method of producing activated carbon using the phosphoric acid activation process. The starting material employed is a young carbonaceous vegetable product which is comminuted to form particles having a very small particle size. The particles are then treated with phosphoric acid and carbonized to produce activated carbon. The starting materials are selected to have a concentration of natural binding agent greater than 30% by weight.

13 Claims, 1 Drawing Sheet

METHOD OF PRODUCING GRANULAR ACTIVATED CARBON

This invention relates to a method of producing granular activated carbon using a chemical activation process.

BACKGROUND OF THE INVENTION

Activated carbon, a porous adsorbent, is widely used in industry in the purification of liquids and gases. For example, a gas which is to be purified is passed through a bed of granular activated carbon. As the gas passes through the activated carbon bed, molecules of impurities in the gas are adsorbed onto the surface of the activated carbon. Consequently, the larger the surface area of the activated carbon the more efficient the filter will be in removing impurities.

Activated carbons of commercial importance can exhibit specific surface areas of up to $1500 m^2/g$ contained in a pore volume of approximately 1ml/g and to achieve this large surface area, pores of very small dimensions are involved. As pore size increases the surface area per unit volume decreases.

Pore sizes are defined as micropores, mesopores and macropores. Micropores and mesopores contribute to the adsorptive capacity of an activated carbon whereas the macropores, containing very little of the total surface area, do not contribute to the adsorptive capacity of the activated carbon.

Therefore, the pore structure of the carbon with its inherent surface area is of paramount importance in determining the effectiveness of the activated carbon as an adsorbent.

However, in the case of granular activated carbon the density is also an important feature of the effectiveness of the adsorbent, as the application of granular activated carbon is invariably in the form of a static bed of fixed volumetric size.

Chemically activated carbon, by virtue of its raw materials and manufacturing process, tends to be of low density with a highly developed mesopore structure. The latter feature is a desirable feature, the former a disadvantage of any granular form of chemically activated carbon. The success of any process to manufacture granular chemically activated carbon is dictated by its capacity to combine retention of the mesoporous nature with development of a high density by minimisation of macroporosity, which does not contribute to adsorptive effectiveness.

The normal method used to determine the efficiency of a granular activated carbon is the weight of material it can adsorb, per unit volume of activated carbon.

This test is normally carried out by placing a volume of activated carbon in a standard U-tube and passing a vapour through the activated carbon. The carbon is weighed before and after this process and the difference provides the weight of substance adsorbed by the carbon.

The raw material normally used in the production of chemically activated carbon is a carbonaceous vegetable material such as wood which has been milled to a 2-5mm particle size. The activated carbon when produced is usually ground into a powder form for use in liquid purification or can be shaped into pellets of various sizes using a binder, for use in gas purification.

There are a number of such uses for activated carbons from the removal of coloured compounds present as impurities in the products of a chemical reaction to the purification of gases prior to discharge to the atmosphere. However, there are a number of problems inherent in the use of wood as a raw material to produce directly a chemically activated pelletised granular form.

The hollow fibrous structure of wood is such that it is impossible to produce a high density granular activated carbon from a wood flour raw material. The wood also lacks a natural binding agent, such as lignin, in sufficiently large quantities and an additional binding agent would have to be introduced in the production of the activated carbon to prevent the breakdown of the particle structure of the granular carbon during processing.

The cellular structure of wood is such that the granular activated carbon produced from it is capable of adsorbing a maximum of 6-7g of impurities/100ml of activated carbon due to its low density. This is below the figure required for a number of applications of activated carbon.

This is not of great importance in a powder liquid phase application as there is normally no strict limit on the volume of activated carbon which can be used.

However, as previously discussed in the case of granular applications, there is an upper limit on the volume of activated carbon which can be used. Consequently, if the granular activated carbon is to be able to perform effectively then the volumetric adsorption factor (g/100ml) must be increased substantially by increase in the product density.

Therefore, the introduction of a method of producing a more efficient activated carbon would be extremely advantageous.

SUMMARY OF THE INVENTION

According to the present invention there is provided a method of producing activated carbon in which the starting material is a young carbonaceous vegetable product.

Preferably, the young carbonaceous vegetable product has a high concentration of natural binding agent, for example greater than 30% by weight.

Nut shell, fruit stone and kernel, and in particular, olive stone, almond shell and coconut shell are especially useful and contain high levels of natural binding agents, for example, lignin.

These materials, when ground to a particle size of 2-5mm as normally used with the chemical activation process, are incapable of absorbing sufficient quantities of the activation chemical and produce inferior quality activated carbon. However, by careful milling and classification, a particle size distribution results which not only allows absorption of sufficient activation chemical but also maximises the density of the resulting carbonised product.

Preferably, the starting material is comminuted to form particles of a mean particle size greater than $30\mu m$ and less than $60\mu m$. The most preferable mean particle size being $40\mu m$.

Preferably, the particles are treated with an activation chemical which impregnates the particles.

Preferably, the treated particles are mixed in a mechanical mixer.

Preferably, the activation chemical is phosphoric acid.

Preferably, the said phosphoric acid is 60-80% ortho phosphoric acid and is added to the particles in a weight ratio of between 1.0:1 and 1.8:1 respectively and preferably a ratio of 1.4:1.

Alternatively, the activation chemical may be zinc chloride solution.

Preferably, the treated particles of starting material are pelletised by a rotary pelletiser.

Preferably, the pellets undergo heat treatment to remove water and other volatile constituents present in the pellets to consolidate the granular nature.

Preferably, the heat treatment comprises heating at a temperature of approximately 120° C. for a duration of between 10 and 40 minutes.

Preferably, the heat treated pellets are carbonised thus producing activated carbon.

Most preferably, the said pellets are carbonised at a temperature between 400° C. and 500° C. for a duration of between 15 minutes and 20 minutes.

Preferably, the remaining activation chemical is washed from the pellets and recycled for repeated use.

Preferably, the pellets of activated carbon are dried.

Further according to the present invention there is provided activated carbon produced by the method of the invention.

BRIEF DESCRIPTION OF THE DRAWING

An embodiment of the present invention will now be described, by way of example, with reference to the accompanying drawing in which.

DESCRIPTION OF PREFERRED EMBODIMENTS

Figure 1:
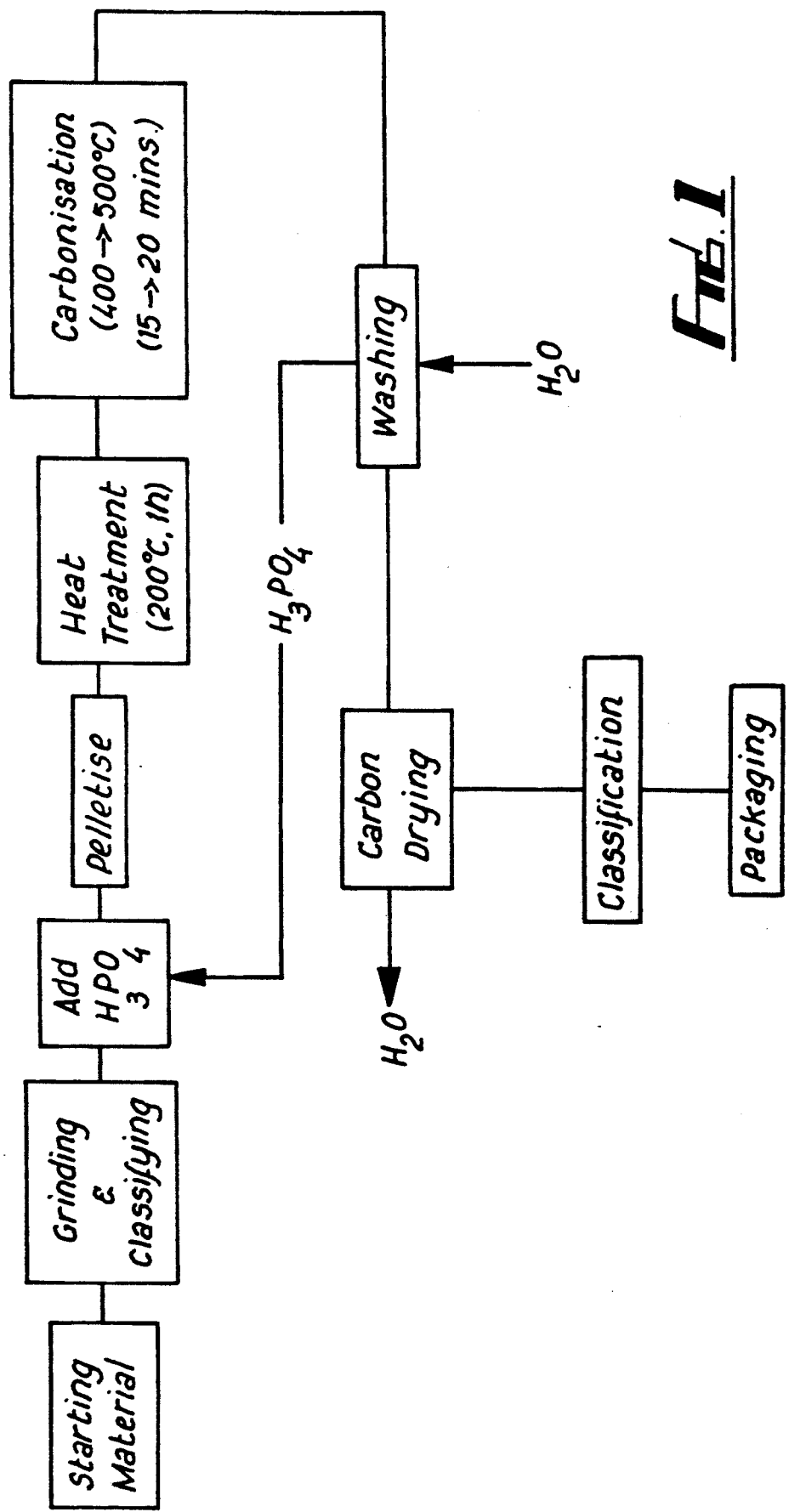
FIG. 1 is a flow chart of the steps involved in a method of producing activated carbon in accordance with the present invention.

As a starting material there is selected a young carbonaceous vegetable product which is high in natural binding agents. The binding agent is lignin and starting materials having a concentration greater than 30% by weight are suitable. One such starting material is olive stones which have a concentration of over 36% lignin by weight. Other starting materials which have a lignin concentration of greater than 30% are almond shell at 30.7% and coconut shell at 34.3%. The embodiment hereafter described relate to the use of olive stones.

Olive stones are ground into particles of a mean particle size of between 30μm and 60μm; the most preferable mean particle size being 40μm. Phosphoric acid (67%) is added to the olive stone particles in a weight ratio of 1.4:1 respectively. Reducing the olive stones to particles of this size before adding the phosphoric acid is important as otherwise the phosphoric acid could not impregnate the olive stones, due to the relatively high density of the stones.

The treated material is mixed in a mechanical mixer for between 15 to 45 minutes.

The phosphoric acid impregnated particles are then pelletised by a rotary pelletiser into pellets of approximately 2 mm to 5 mm length and between 1.0 mm to 3.0 mm diameter.

The said pellets are then heated at approximately 120° C. for a duration of between 10 and 40 minutes and preferably for 20 minutes. Heating of the pellets in this way minimises the entrapment of bubbles of escaping volatile material during subsequent carbonisation and consolidate the granular form.

The pellets then undergo carbonisation in which they are heated to a temperature between 400° C. and 500° C. for a duration of between 15 minutes and 20 minutes, thus producing activated carbon.

The activated carbon is then washed to recover any residual phosphoric acid and the said phosphoric acid is then recycled for re-use in the process.

The granular chemically activated carbon is then dried to remove water, and classified according to the size of the pellets.

The final product of pelletised chemically activated carbon is then packaged for distribution.

Modifications and improvements may be incorporated without departing from the scope of the invention.

I claim:

1. A method of producing activated carbon comprising the steps of:
   providing a starting material in the form of a carbonaceous vegetable product, said carbonaceous vegetable product having a concentration of natural binding agent which is greater than 30% by weight;
   comminuting said starting material to form particles of a means particle size greater than 30 μm and less than 60 μm;
   mixing said comminuted particles of starting material with phosphoric acid to impregnate the particles with said acid;
   pelletising said mixture of comminuted particles and phosphoric acid to form pellets;
   subjecting said pellets to a drying treatment comprising heating the pellets to remove water and other volatile constituents present to consolidate the granular nature; and
   carbonising the treated particles at a temperature from about 400° C. to about 500° C.

2. A method as claimed in claim 1, wherein the starting material is a nut shell.

3. A method as claimed in claim 1, wherein the starting material is a fruit stone.

4. A method as claimed in claim 1, wherein the starting material is a kernel.

5. A method as claimed in claim 1, wherein the starting material is olive stone.

6. A method as claimed in claim 1, wherein the starting material is almond shell.

7. A method as claimed in claim 1, wherein the starting material is coconut shell.

8. A method as claimed in claim 1, wherein the natural binding agent is lignin.

9. A method as claimed in claim 1, wherein the mean particle size is 40μm.

10. A method as claimed in claim 1, wherein the said phosphoric acid is 60-80% ortho phosphoric acid and is added to the particles in a weight ratio of between 1.0:1 and 1.8:1 respectively.

11. A method as claimed in claim 10, wherein the ratio is 1.4:1.

12. A method as claimed in claim 1, wherein the drying treatment comprises heating at a temperature of approximately 120° for a duration of between 10 and 40 minutes.

13. A method as claimed in claim 12, wherein the treated particles are carbonised for a duration of between 15 minutes and 20 minutes.

* * * * *